(12) United States Patent
Wong et al.

(10) Patent No.: US 10,785,081 B2
(45) Date of Patent: Sep. 22, 2020

(54) WIRELESS COMMUNICATION TRANSCEIVER AND WIRELESS COMMUNICATION METHOD

(71) Applicant: Sony Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,526

(22) PCT Filed: Aug. 18, 2017

(86) PCT No.: PCT/EP2017/070978
§ 371 (c)(1),
(2) Date: Feb. 6, 2019

(87) PCT Pub. No.: WO2018/033641
PCT Pub. Date: Feb. 22, 2018

(65) Prior Publication Data
US 2019/0173726 A1    Jun. 6, 2019

(30) Foreign Application Priority Data
Aug. 19, 2016 (EP) .................... 16185036

(51) Int. Cl.
*H04L 27/34* (2006.01)
*H04W 76/27* (2018.01)
*H04L 1/18* (2006.01)
*H04W 72/04* (2009.01)

(52) U.S. Cl.
CPC ........ *H04L 27/3405* (2013.01); *H04L 1/1812* (2013.01); *H04W 72/044* (2013.01); *H04W 76/27* (2018.02)

(58) Field of Classification Search
CPC ............. H04W 76/046; H04W 72/042; H04W 72/1247; H04W 76/27; H04W 72/044; H04W 72/1289; H04W 72/082; H04W 72/0466; H04W 88/02; H04L 5/00; H04L 5/0023; H04L 27/3488; H04L 5/0091; H04L 27/3405; H04L 1/1812; H04L 69/324; H04L 25/0202; H04J 11/004
See application file for complete search history.

(56) References Cited

U.S. PATENT DOCUMENTS

2007/0054624 A1* 3/2007 Kashiwagi ............ H04L 1/0003
455/67.13
2015/0236884 A1    8/2015 Suh et al.
(Continued)

OTHER PUBLICATIONS

NTT Docomo, "New SID Proposal: Study on New Radio Access Technology", 3GPP TSG RAN Meeting No. 71 RP-160671, Göteborg, Sweden, Mar. 7-10, 2016, 8 pages.
(Continued)

*Primary Examiner* — Jung Liu
(74) *Attorney, Agent, or Firm* — Xsensus LLP (57) ABSTRACT

A wireless communication transceiver comprising circuitry configured to send or receive, via a wire-less link, an indicator indicating a Non-Uniform Constellation pattern out of a plurality of Non-Uniform Constellation patterns.

16 Claims, 10 Drawing Sheets

(56) References Cited

U.S. PATENT DOCUMENTS

| | | | | |
|---|---|---|---|---|
| 2016/0049998 | A1* | 2/2016 | Choi | H04B 7/0413 |
| | | | | 375/267 |
| 2016/0316513 | A1* | 10/2016 | Lee | H04L 5/00 |
| 2016/0366003 | A1* | 12/2016 | Kwon | H04L 1/0001 |
| 2016/0380726 | A1* | 12/2016 | Jeong | H03M 13/11 |
| | | | | 714/776 |
| 2017/0290046 | A1* | 10/2017 | Sun | H04W 74/006 |
| 2018/0159715 | A1* | 6/2018 | Mouhouche | H04L 27/3405 |
| 2019/0044783 | A1* | 2/2019 | Stadelmeier | H04L 27/34 |

OTHER PUBLICATIONS

Sony, "Consideration of NU-QAM for the NR", 3GPP TSG RAN WG1 #85 R1-164653, Nanjing, China, May 23-27, 2016, 5 pages.
International Search Report dated Jan. 15, 2018 for PCT/EP2017/070978 filed on Aug. 18, 2017, 13 pages.

* cited by examiner

| | |
|---|---|
| Resource Allocation Header | 11 |
| Resource Assignment | 12 |
| MCS Index | 13 |
| HARQ Process Number | 14 |
| New Data Indicator | 15 |
| Redundancy Version | 16 |
| Uplink Power Control Command | 17 |
| Downlink Assignment Index | 18 |
| NUC Pattern Indicator | 19 |

Fig. 2a

| NUC Pattern Indicator | NUC Pattern |
|---|---|
| 0 | QPSK |
| 1 | 16QAM Uniform Constellation |
| 2 | 16QAM NUC #1 |
| 3 | 16QAM NUC #2 |
| 4 | 64QAM Uniform Constellation |
| 5 | 64QAM NUC #1 |
| 6 | 64QAM NUC #2 |
| 7 | 64QAM NUC #3 |
| 8 | 256QAM NUC #1 |
| 9 | 256QAM NUC #2 |
| 10 | 256QAM NUC #3 |
| 11 | 256QAM NUC #4 |
| 12 | 256QAM NUC #5 |
| 13 | 1024QAM NUC #1 |
| 14 | 1024QAM NUC #2 |
| 15 | 1024QAM NUC #3 |

Fig. 2b

| MCS Index $I_{MCS}$ | Modulation Order $Q_m$ | TBS Index $I_{TBS}$ | NUC Indicator $I_{NUC}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 4 | 9 | 0 |
| 11 | 4 | 10 | 0 |
| 12 | 4 | 11 | 1 |
| 13 | 4 | 12 | 1 |
| 14 | 4 | 13 | 2 |
| 15 | 4 | 14 | 2 |
| 16 | 4 | 15 | 2 |
| 17 | 6 | 15 | 0 |
| 18 | 6 | 16 | 1 |
| 19 | 6 | 17 | 1 |
| 20 | 6 | 18 | 2 |
| 21 | 6 | 19 | 2 |
| 22 | 6 | 20 | 3 |
| 23 | 6 | 21 | 3 |
| 24 | 6 | 22 | 4 |
| 25 | 6 | 23 | 5 |
| 26 | 6 | 24 | 6 |
| 27 | 8 | 25 | 1 |
| 28 | 8 | 26 | 2 |
| 29 | 8 | 27 | 3 |
| 30 | 8 | 28 | 4 |
| 31 | 8 | 29 | 5 |

Fig. 3a

| Modulation Order $Q_m = 2$ ||
|---|---|
| NUC Indicator | NUC Pattern |
| 0 | QPSK |

| Modulation Order $Q_m = 4$ ||
|---|---|
| NUC Indicator | NUC Pattern |
| 0 | 16QAM Uniform Constellation |
| 1 | 16QAM NUC #1 |
| 2 | 16QAM NUC #2 |

| Modulation Order $Q_m = 6$ ||
|---|---|
| NUC Indicator | NUC Pattern |
| 0 | 64QAM Uniform Constellation |
| 1 | 64QAM NUC #1 |
| 2 | 64QAM NUC #2 |
| 3 | 64QAM NUC #3 |
| 4 | 64QAM NUC #4 |
| 5 | 64QAM NUC #5 |
| 6 | 64QAM NUC #6 |

| Modulation Order $Q_m = 8$ ||
|---|---|
| NUC Indicator | NUC Pattern |
| 1 | 256QAM NUC #1 |
| 2 | 256QAM NUC #2 |
| 3 | 256QAM NUC #3 |
| 4 | 256QAM NUC #4 |
| 5 | 256QAM NUC #5 |

Fig. 3b

| MCS Index $I_{MCS}$ | Modulation Order $Q_m$ | TBS Index $I_{TBS}$ | NUC Indicator (New Data Packet) $I_{NUC}$ | NUC Indicator (Retransmission) $I_{NUC\_ReTx}$ |
|---|---|---|---|---|
| 0 | 2 | 0 | 0 | 0 |
| 1 | 2 | 1 | 0 | 0 |
| 2 | 2 | 2 | 0 | 0 |
| 3 | 2 | 3 | 0 | 0 |
| 4 | 2 | 4 | 0 | 0 |
| 5 | 2 | 5 | 0 | 0 |
| 6 | 2 | 6 | 0 | 0 |
| 7 | 2 | 7 | 0 | 0 |
| 8 | 2 | 8 | 0 | 0 |
| 9 | 2 | 9 | 0 | 0 |
| 10 | 4 | 9 | 0 | 0 |
| 11 | 4 | 10 | 0 | 0 |
| 12 | 4 | 11 | 1 | 1 |
| 13 | 4 | 12 | 1 | 2 |
| 14 | 4 | 13 | 2 | 3 |
| 15 | 4 | 14 | 2 | 3 |
| 16 | 4 | 15 | 2 | 3 |
| 17 | 6 | 15 | 0 | 0 |
| 18 | 6 | 16 | 1 | 1 |
| 19 | 6 | 17 | 1 | 2 |
| 20 | 6 | 18 | 2 | 3 |
| 21 | 6 | 19 | 2 | 3 |
| 22 | 6 | 20 | 3 | 4 |
| 23 | 6 | 21 | 3 | 4 |
| 24 | 6 | 22 | 4 | 5 |
| 25 | 6 | 23 | 5 | 6 |
| 26 | 6 | 24 | 6 | 7 |
| 27 | 8 | 25 | 1 | 2 |
| 28 | 8 | 26 | 2 | 3 |
| 29 | 8 | 27 | 3 | 4 |
| 30 | 8 | 28 | 4 | 5 |
| 31 | 8 | 29 | 5 | 6 |

Fig. 4a

| Modulation Order $Q_m = 2$ ||
|---|---|
| NUC Indicator | NUC Pattern |
| 0 | QPSK |

| Modulation Order $Q_m = 4$ ||
|---|---|
| NUC Indicator | NUC Pattern |
| 0 | 16QAM Uniform Constellation |
| 1 | 16QAM NUC #1 |
| 2 | 16QAM NUC #2 |
| 3 | 16QAM NUC #3 |

| Modulation Order $Q_m = 6$ ||
|---|---|
| NUC Indicator | NUC Pattern |
| 0 | 64QAM Uniform Constellation |
| 1 | 64QAM NUC #1 |
| 2 | 64QAM NUC #2 |
| 3 | 64QAM NUC #3 |
| 4 | 64QAM NUC #4 |
| 5 | 64QAM NUC #5 |
| 6 | 64QAM NUC #6 |
| 7 | 64QAM NUC #7 |

| Modulation Order $Q_m = 8$ ||
|---|---|
| NUC Indicator | NUC Pattern |
| 1 | 256QAM NUC #1 |
| 2 | 256QAM NUC #2 |
| 3 | 256QAM NUC #3 |
| 4 | 256QAM NUC #4 |
| 5 | 256QAM NUC #5 |
| 6 | 256QAM NUC #6 |

Fig. 4b

| NUC Type | 16QAM | 64QAM | 256QAM | 1024QAM |
|---|---|---|---|---|
| Uniform Constellation | Yes | Yes | Yes | Yes |
| 1-dimensional NUC | Yes | Yes | Yes | No |
| 2-dimensional NUC | Yes | Yes | No | No |

WIRELESS COMMUNICATION TRANSCEIVER AND WIRELESS COMMUNICATION METHOD

CROSS-REFERENCE TO RELATED APPLICATIONS

The present application is based on PCT filing PCT/EP2017/070978, filed Aug. 18, 2017, and claims priority to 16185036.7, filed in the European Patent Office on Aug. 19, 2016, the entire contents of each of which being incorporated herein by reference.

TECHNICAL FIELD

The present disclosure generally pertains to the field of wireless communication transceivers and to wireless communication methods.

TECHNICAL BACKGROUND

Several generations of mobile telecommunications systems are known, for example the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is still under development.

The basis for 5G is the so-called Long Term Evolution ("LTE"), which is a wireless communication technology allowing high-speed data communications for mobile phones and data terminals and which is already presently used for 4G mobile telecommunications systems.

However, for allowing a higher speed for data communications in 5G than in 4G, some improvements have to be achieved for signaling in wireless communication technologies, such as LTE.

Therefore, it is desirable to provide techniques for improved signaling in wireless communication technologies.

SUMMARY

According to a first aspect, the disclosure provides a wireless communication transceiver comprising circuitry configured to send or receive, via a wireless link, an indicator indicating a Non-Uniform Constellation pattern out of a plurality of Non-Uniform Constellation patterns.

According to a second aspect, the disclosure provides a wireless communication method comprising signaling, via a wireless link, from a first transceiver of the wireless link to a second transceiver of the wireless link, an indicator indicating a Non-Uniform Constellation pattern out of a plurality of Non-Uniform Constellation patterns.

Further aspects are set forth in the dependent claims, the following description, and the drawings.

BRIEF DESCRIPTION OF THE DRAWINGS

Embodiments are explained by way of example with respect to the accompanying drawings, in which.

DETAILED DESCRIPTION OF EMBODIMENTS

Before a detailed description of the embodiments under reference of FIG. 1, some general explanations are made.

The following description will exemplarily refer to LTE (Long Term Evolution) technology, in order to explain the embodiments of the present disclosure. However, the skilled person will readily appreciate that the present disclosure is not limited to LTE technology. Moreover, although the present description generally refers to "LTE", the skilled person will appreciate that "LTE" shall cover also more advanced versions of LTE, such as LTE-A (LTE advance), LTE-B, which is not yet standardized, but under development, etc. All those versions are referred to as "LTE" in the following.

In the embodiments described below, a wireless communication transceiver is disclosed, comprising circuitry configured to send or receive, via a wireless link, an indicator indicating a Non-Uniform Constellation (NUC) pattern out of a plurality of NUC patterns.

The wireless communication transceiver may be, for example, a transceiver, such as a user equipment (UE) or a base station like an eNodeB, in a Radio Access Network (RAN). The RAN may be, for example, an LTE network or a New Radio (NR) network. However, the RAN is not limited to LTE and NR. The wireless communication transceiver may be, for example, a first wireless communication transceiver in the RAN, and the wireless link may be a connection in the RAN between the first wireless communication transceiver and a second wireless communication transceiver. The wireless communication transceiver may be, for example, a user equipment (UE) such as a mobile phone, a smartphone, a computer, tablet, tablet personal computer, or the like, including a mobile communication interface, or any other device which is able to perform a mobile telecommunication via, for example, LTE, such as a hot spot device with a mobile communication interface, etc.

The NUC pattern indicated by the indicator may be, for example, a NUC pattern that is used by the first or the second wireless communication transceiver for modulating information that is exchanged via the wireless link, or that the first or the second wireless communication transceiver requests to use for modulating information that is exchanged via the wireless link. The information modulated by the NUC pattern may for example be a scheduled data packet, for example transmitted via a Physical Downlink Shared Channel (PDSCH) or via a Physical Uplink Shared Channel (PUSCH).

The indicator may be transmitted using explicit or implicit signaling, and may be used for all wireless links, for example for uplink, for downlink, for backhaul, or for sidelink connections.

The circuitry may further be configured to exchange, via the wireless link, information being modulated using the NUC pattern indicated by the indicator. For example, the first wireless communication transceiver may exchange the information modulated using the NUC pattern indicated by the indicator with the second wireless communication transceiver.

In some embodiments, the indicator is contained in a Downlink Control Information (DCI). The DCI may be the DCI specified in LTE. The DCI may be, for example, sent by a base station and received by a user equipment. In particular, the indicator may be an index to an entry of a reference lookup table, the reference lookup table providing Non-Uniform Constellation (NUC) patterns for respective indices. The indicator may be an explicit indicator, which is specifically introduced to indicate a NUC pattern, or it may be an implicit indicator, e.g. an indicator that is already transmitted for other purposes and that is used to also indicate a NUC pattern. For example, an implicit indicator may be an indicator that has already been specified in a mobile wireless standard for a purpose different than indicating a NUC pattern, and that is reused to also indicate a NUC pattern in a second mobile wireless standard.

The reference lookup table may be stored in a memory that is comprised by the wireless communication transceiver, and the wireless communication transceiver may read, upon receiving the indicator, the entry of the reference lookup table indicated by the index. The entry of the reference lookup table indicated by the index may contain information about a modulation order or about a NUC pattern to be used in a scheduled data packet transmitted, for example, via the PDSCH or the PUSCH.

The reference lookup table (form and content) may be, for example, defined in a specification of a mobile wireless standard, such as, for example, an improvement of LTE.

In other embodiments, the indicator is an explicit NUC pattern indicator in a new field in the DCI. This may give full flexibility to the network to manage a NUC pattern to be used. For example, a retransmission of a data packet may use another NUC pattern than a previous transmission of the data packet.

In yet other embodiments, there is a plurality of reference lookup tables providing NUC patterns, and the wireless communication transceiver may be configured by a network to use one out of the plurality of reference lookup tables. For example, if the wireless communication transceiver is a UE, the network or an eNodeB may configure the UE, for instance by a Radio Resource Control (RRC) configuration, to use one out of the plurality of reference lookup tables.

In yet other embodiments, the index is a Modulation and Coding Scheme (MCS) index. The MCS index may be an MCS index defined in a specification of a mobile wireless standard, for example of LTE. The MCS index may be contained in a DCI, and may be used to indicate an MCS of a scheduled data packet, for example a scheduled data packet that is transmitted via a PDSCH or via a PUSCH. The MCS index may be an index of an MCS table, which is a reference lookup table and may provide a NUC indicator for each MCS index.

In yet another embodiment, the reference lookup table provides a first set of NUC patterns for a New Data Indicator (NDI) being set and a second set of NUC patterns for the NDI being not set. The NDI may be, for example, an NDI bit signaled in a DCI, and may inform a wireless communication transceiver such as a UE whether a scheduled data packet is a new data packet or a retransmission. The NDI bit may be used for implicitly indicating a NUC pattern. For example, a new data packet may be modulated using a first NUC pattern associated with an MCS index, and a subsequent retransmission of the data packet may be modulated using a second NUC pattern associated with the same MCS index.

The first and the second NUC pattern may for example be defined in an MCS table similar to the above MCS table, with an additional column providing a second NUC indicator for retransmissions.

In another embodiment, the indicator is an indicator indicating a redundancy version for a Hybrid Automatic Repeat Request (HARQ) retransmission. The redundancy version may for example be indicated in a DCI for each HARQ retransmission, and may implicitly point to a NUC pattern. A relationship between the redundancy version, an MCS, and the NUC pattern may be specified in a specification of a mobile wireless standard, for example in the form of a reference lookup table.

The circuitry may further be configured to send or receive, via the wireless link, information indicating a transceiver's capability of encoding and decoding NUC patterns. For example, a UE may indicate to a base station, such as an eNodeB, its NUC capability, that is whether it can decode, for a downlink transmission, or encode, for an uplink transmission, information modulated using a NUC. Additionally, the UE may, in some embodiments, also indicate its level of NUC capabilities for decoding and for encoding. A network or an eNodeB may configure the UE to use one out of a plurality of reference lookup tables, such as, for example, MCS tables, that provide a set of NUC patterns according to the NUC capabilities of the UE. There may also be one out of the plurality of reference lookup tables that contains only uniform constellation patterns, for example for the case of a UE that cannot perform decoding or encoding of NUC patterns at all.

A 1-dimensional NUC may be less complex to decode than a 2-dimensional NUC, but still provide gain over a uniform constellation, although the gain may be not as great as for a 2-dimensional NUC. Additionally, a complexity of decoding a NUC increases as a modulation order increases. Hence, in some embodiments, the information indicating a capability of encoding and decoding NUC patterns may include information indicating which types of NUC the UE can decode.

Also, in some embodiments, a UE may have a finite amount of processing capability, for example for the case of a UE where baseband processing is performed on a general purpose processor or Digital Signal Processor (DSP). In some UE architectures, processing resources may be assigned to different functions dynamically, for example an amount of processing resources applied to channel estimation may be adapted based on a complexity of a channel being decoded, and unused resources may be assigned to different receiver functions, such as demodulation. A capability of a UE for decoding modulation symbols, such as a capability of decoding uniform constellations or 1-dimensional or 2-dimensional NUCs, may thus vary dynamically.

Therefore, in some embodiments of the present disclosure, a UE may signal its capability to decode different modulation patterns, for example different NUCs, and different modulation orders, such as 16QAM, 64QAM, or 256QAM, within uplink feedback signaling, such as a Channel State Information (CSI).

In other embodiments, capabilities of a base station, such as, for example, an eNodeB, of decoding and encoding NUC patterns may also be limited. For example, a base station may be able to encode NUCs in downlink direction, but may not be able to decode NUCs in uplink direction.

To facilitate the different capabilities of decoding and encoding NUCs, a base station may signal in System Information Block (SIB) signaling or unicast RRC signaling, for instance at connection setup, which NUCs it uses in uplink and downlink directions.

If a base station does not support NUCs, a default set of uniform constellations may be used, allowing DCI and Uplink Control Information (UCI) signaling and processing to be simplified.

The circuitry may further be configured to send or receive the information indicating a capability of encoding and decoding NUC patterns during an RRC connection.

The information indicating a capability of encoding and decoding NUC patterns may also be contained in a SIB.

In yet other embodiments, the indicator is contained in Uplink Control Information (UCI). For example, the UCI may be transmitted by a UE to a network or to a base station. This may be used in a case where the UE can decide on an uplink data packet format, such as MCS and TBS. An example usage of this embodiment may be an autonomous or unscheduled transmission in the uplink direction. Another usage may be where a network configures, for example via RRC configuration, a plurality of NUC patterns for use in the uplink direction and a UE selects one out of the plurality of NUC patterns based on its TBS and uplink radio conditions.

Uplink radio conditions may be signaled by a network or determined by a UE in a Time-Division Duplex (TDD) system via channel reciprocity.

A UCI may be embedded in a data channel, like PUSCH, or transmitted as a separate control channel such as a Physical Uplink Control Channel (PUCCH).

In yet other embodiments, the indicator is an indicator indicating a group of Resource Blocks (RBs) used for exchanging the information, and a NUC pattern may be assigned to a respective group of RBs. For example, each group of RBs used to carry downlink or uplink data may use a different NUC pattern, and may form a NUC RB.

A size of a NUC RB may be predefined in a specification of a mobile wireless standard or configured by a network. A DCI or UCI may indicate a NUC pattern used for a NUC RB.

In some embodiments, different RBs in a selective channel may experience different Signal-to-Noise Ratios (SNRs) and hence may benefit from a different NUC pattern.

A base station may determine a NUC pattern to be used in each NUC RB based on either channel reciprocity, for instance for a TDD system or any system where a downlink channel and an uplink channel are similar, or on a CSI, whereby a UE may report downlink channel conditions to a base station in an uplink. In some embodiments, the CSI may indicate a preferred NUC pattern for each NUC RB, or for at least one NUC RB.

In some embodiments, the indicator may be included in a Channel State Information (CSI).

Instead of signaling a NUC pattern in a DCI or UCI per NUC RB, a base station may use a preferred NUC pattern signaled in a last CSI received from a UE. Then, a NUC pattern used may be known implicitly between the UE and the base station.

Other embodiments pertain to a wireless communication method comprising signaling, via a wireless link, from a first transceiver of the wireless link to a second transceiver of the wireless link, an indicator indicating a NUC pattern out of a plurality of NUC patterns. The wireless communication method may comprise some or all of the features described above with respect to communication transceivers.

In the following, embodiments will be described in more details by reference to the drawings.

LTE uses quadrature amplitude modulation (QAM) to achieve high spectral efficiency. Different types of quadrature amplitude modulation (QAM) patterns are illustrated in FIGS. 1a, 1b, and 1c, as shown in the standard document R1-164653.

Figure 1A:
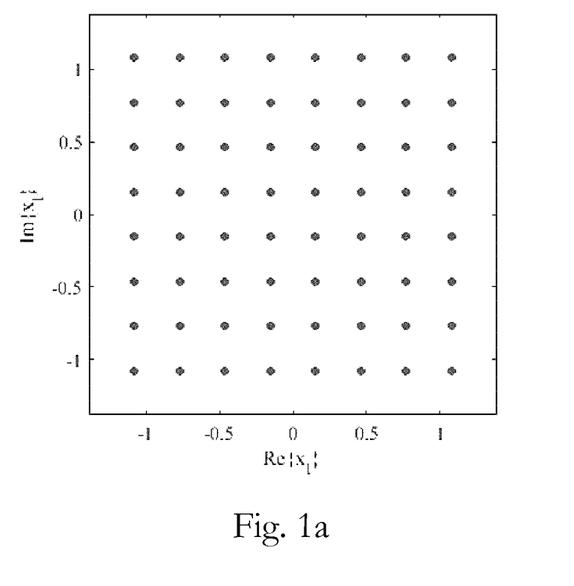
FIG. 1 illustrates different types of quadrature amplitude modulation (QAM) patterns.

In FIG. 1a, a uniform constellation pattern is shown. In a uniform constellation, the constellation points are uniformly distributed. The skilled person will appreciate that, in some cases, a NUC pattern may provide better performance than a uniform constellation pattern. A uniform QAM constellation comprising four constellation points is called Quadrature Phase-Shift Keying (QPSK). QAM constellations of higher modulation orders are named according to their number of constellation points, for example 16QAM, 64QAM, or 256QAM. The QAM constellation shown in FIG. 1a is a 64QAM. Higher spectral efficiency is expected in NR, and hence, higher modulation orders are likely to be used, such as 1024QAM or higher. As a modulation order increases, a required SNR increases in order to maintain a targeted error rate, for example a BLER of 10%. Therefore, it may be advantageous to use NUCs for high order modulation. Constellation points in a NUC are not arranged in a uniform manner.

Figure 1B:
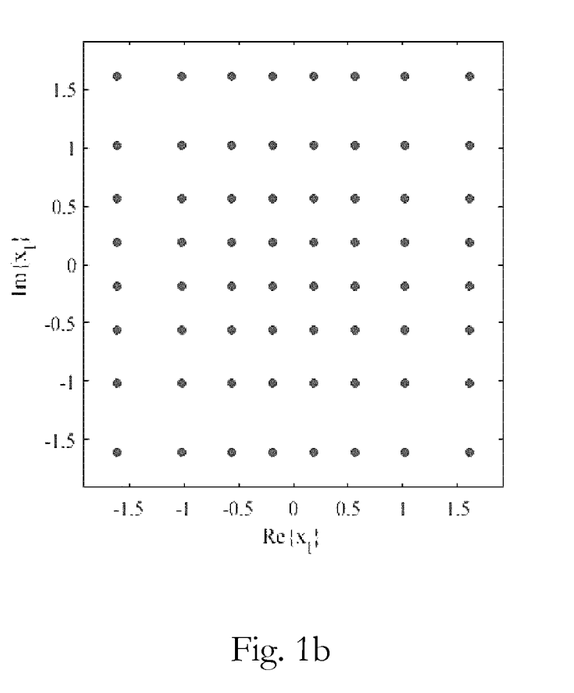

FIG. 1b gives an example for a 64QAM NUC pattern, where some constellation points are closer together than others. For an equal modulation order, NUC enables a targeted error rate to be achieved at a lower SNR compared to a uniform constellation. NUC is shown to provide up to 1.85 dB gain over a uniform constellation for 1024QAM. A NUC pattern is typically optimized for a specific operating SNR or range of SNR. For example, if a signal is received at 13 dB, a NUC pattern optimized for SNR 12 dB to 15 dB may perform better than another NUC pattern that is optimized for 15 dB to 18 dB SNR. Hence, a plurality of NUC patterns for a specific modulation order may be used in a data transmission.

Figure 1C:
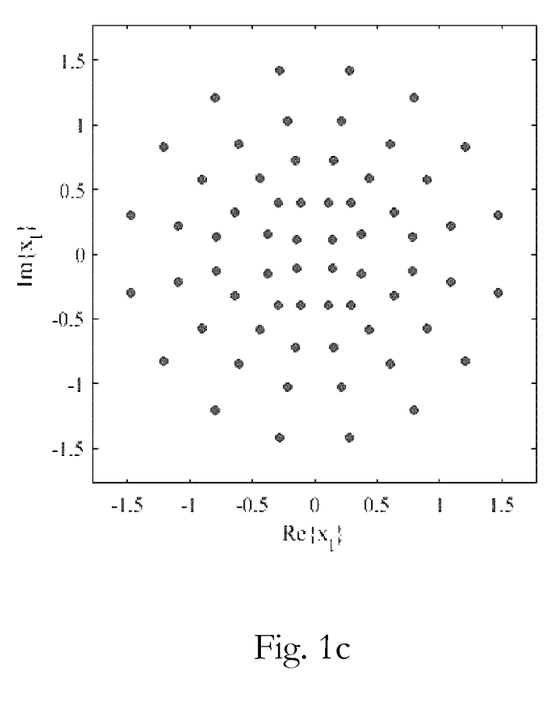

FIG. 1c shows another NUC pattern. While the NUC pattern in FIG. 1b is a 1-dimensional 64QAM NUC pattern, the NUC pattern in FIG. 1c is a 2-dimensional 64QAM NUC pattern, characterized by a broadly circular shape. A performance of a 1-dimensional NUC is slightly inferior to that of a 2-dimensional NUC, but a 1-dimensional NUC is simpler to decode than a 2-dimensional NUC.

Figure 2A:
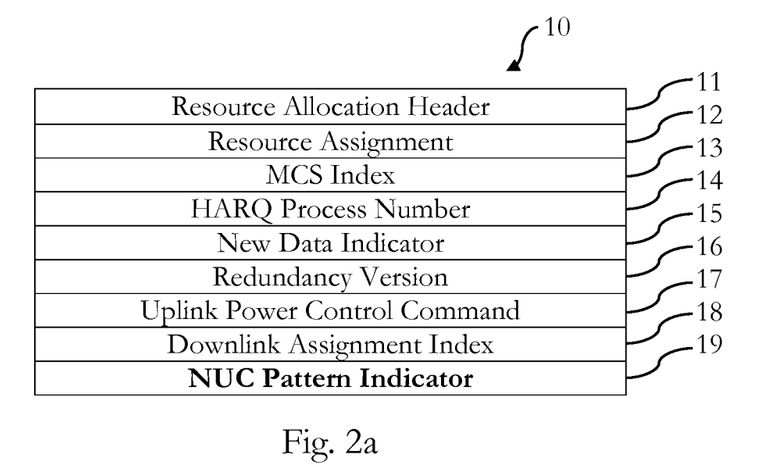
FIG. 2 shows an example Downlink Control Information (DCI) providing a Non-Uniform Constellation (NUC) pattern indicator.

FIG. 2a illustrates an embodiment in which an indicator indicating a Non-Uniform Constellation (NUC) pattern out of a plurality of NUC patterns is contained in Downlink Control Information (DCI). The example DCI 10 comprises several fields, each field containing information about a downlink connection. In the example of FIG. 2a, the information contained in the fields comprises a resource allocation header 11, a resource assignment 12, an MCS index 13, a HARQ process number 14, a new data indicator 15, a redundancy version 16, an uplink power control command 17, and a downlink assignment index 18. In particular, the DCI 10 comprises a field 19 containing a NUC indicator explicitly indicating a NUC pattern. The precise content of the DCI 10 may vary depending on the mobile wireless standard. What fields are comprised by a DCI 10 and how the fields are interpreted may be defined in a mobile wireless standard.

Figure 2B:
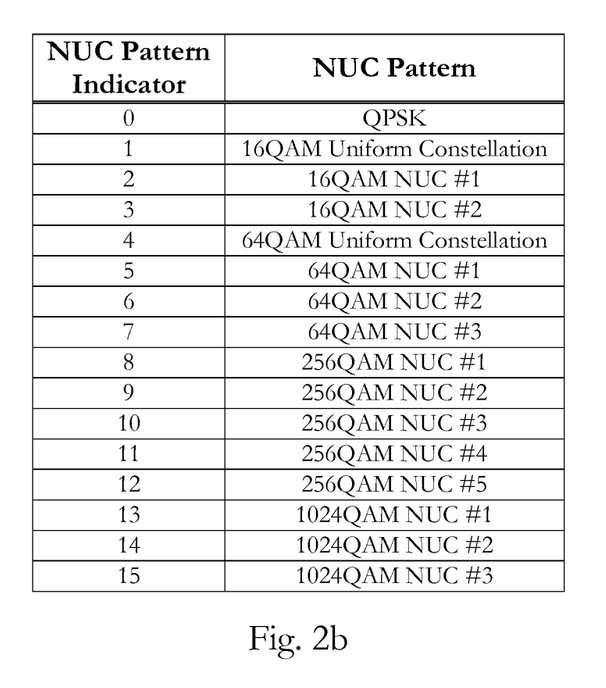

FIG. 2b illustrates an embodiment of a reference lookup table providing NUC patterns for respective indices. The lookup table provides examples of possible NUC pattern indicators that may be specified by the NUC field in DCI and the respective NUC patterns that are associated with the indices. Since in some cases, a uniform constellation pattern may perform better than a NUC, or a transceiver may not have the capability of encoding or decoding NUC patterns, the lookup table provides uniform constellation patterns for some values of the NUC pattern indicator. In the illustrated example, a NUC pattern indicator "0" indicates Quadrature Phase-Shift Keying (QPSK), which is identical to a 4QAM uniform constellation pattern, a NUC pattern indicator "1" indicates a 16QAM uniform constellation pattern, a NUC pattern indicator "2" indicates a 16QAM NUC pattern of a first type, a NUC pattern indicator "3" indicates a 16QAM NUC pattern of a second type, a NUC pattern indicator "4" indicates a 64QAM uniform constellation pattern, a NUC pattern indicator "5" indicates a 64QAM NUC pattern of a first type, a NUC pattern indicator "6" indicates a 64QAM NUC pattern of a second type, a NUC pattern indicator "7" indicates a 64QAM NUC pattern of a third type, a NUC pattern indicator "8" indicates a 256QAM NUC pattern of a first type, a NUC pattern indicator "9" indicates a 256QAM NUC pattern of a second type, a NUC pattern indicator "10" indicates a 256QAM NUC pattern of a third type, a NUC pattern indicator "11" indicates a 256QAM NUC pattern of a fourth type, a NUC pattern indicator "12" indicates a 256QAM NUC pattern of a fifth type, a NUC pattern indicator "13" indicates a 1024QAM NUC pattern of a first type, a NUC pattern indicator "14" indicates a 1024QAM NUC pattern of a second type, and a NUC pattern indicator "15" indicates a 1024QAM NUC pattern of a third type. There are different types of NUC patterns defined for some modulation orders because each NUC pattern may be optimized only for a specific Signal-to-Noise Ratio (SNR). This is only an example. The content and structure of the NUC indicator field 19 may be defined in a mobile wireless standard.

Figure 3A:
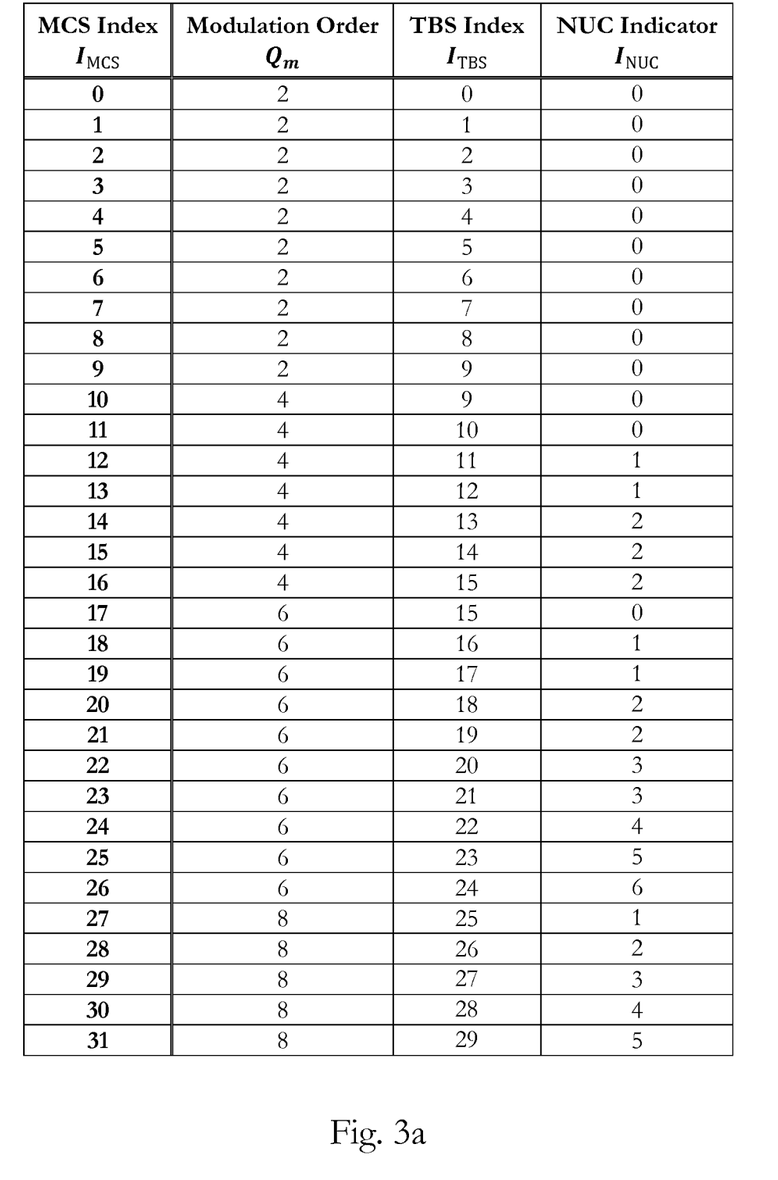
FIG. 3 shows an example Modulation and Coding Scheme (MCS) table providing a NUC indicator.

FIG. 3a illustrates an embodiment in which an indicator indicating a Non-Uniform Constellation (NUC) pattern out of a plurality of NUC patterns is a Modulation and Coding Scheme (MCS) index.

The figure shows an MCS table that relates each MCS index with a respective NUC indicator $I_{NUC}$. The MCS table may be defined in a specification of a mobile wireless standard. The MCS table may provide for each MCS index $I_{MCS}$ a modulation order $Q_m$, a TBS index $I_{TBS}$ indicating a TBS for a scheduled number of Resource Blocks (RBs), and a NUC indicator $I_{NUC}$. In this embodiment, the MCS index which is foreseen to indicate the modulation order $Q_m$ is also foreseen to implicitly indicate a NUC pattern.

In this embodiment, there is defined one NUC pattern (or a uniform constellation pattern) for each modulation order, indicated by the NUC indicator. The NUC indicator refers to a lookup table such as one of the lookup tables shown in the embodiment of FIG. 3b.

Figure 3B:
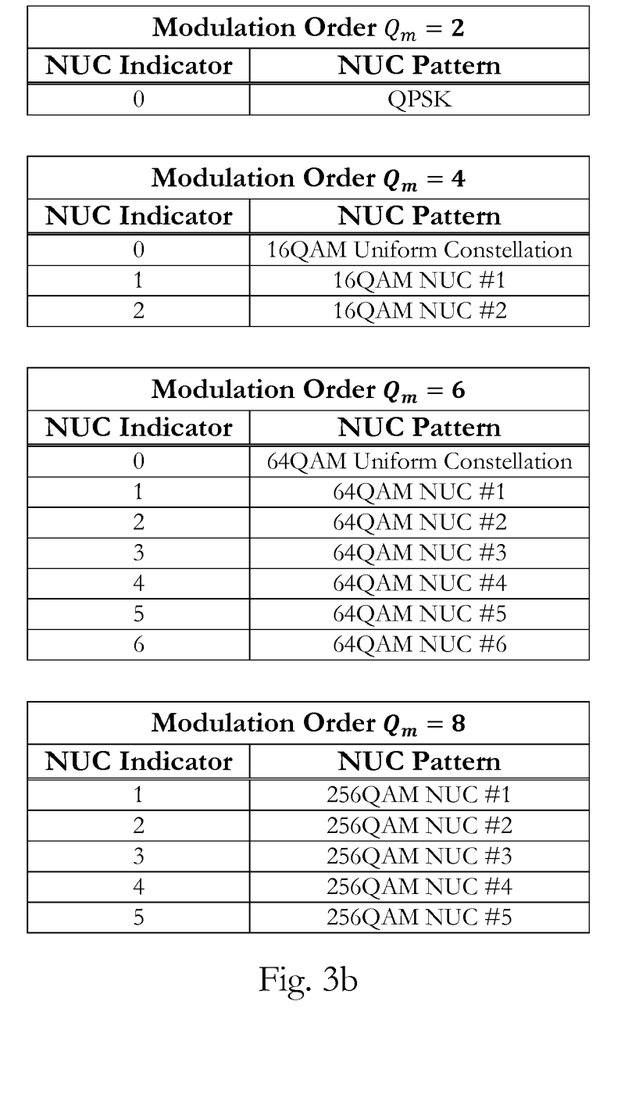

FIG. 3b shows lookup tables for a NUC indicator provided by an MCS table, such as the MCS table from FIG. 3a. For each modulation order, there is an own separate lookup table for the NUC indicator.

In the NUC indicator lookup table for a modulation order of two, a NUC indicator "0" indicates Quadrature Phase-Shift Keying (QPSK), which is a 4QAM uniform constellation pattern.

In the NUC indicator lookup table for a modulation order of four, a NUC indicator "0" indicates a 16QAM uniform constellation pattern, a NUC indicator "1" indicates a 16QAM NUC pattern of a first type, and a NUC indicator "2" indicates a 16QAM NUC pattern of a second type.

In the NUC indicator lookup table for a modulation order of six, a NUC indicator "0" indicates a 64QAM uniform constellation pattern, a NUC indicator "1" indicates a 64QAM NUC pattern of a first type, a NUC indicator "2" indicates a 64QAM NUC pattern of a second type, a NUC indicator "3" indicates a 64QAM NUC pattern of a third type, a NUC indicator "4" indicates a 64QAM NUC pattern of a fourth type, a NUC indicator "5" indicates a 64QAM NUC pattern of a fifth type, and a NUC indicator "6" indicates a 64QAM NUC pattern of a sixth type.

In the NUC indicator lookup table for a modulation order of eight, a NUC indicator "1" indicates a 256QAM NUC pattern of a first type, a NUC indicator "2" indicates a 256QAM NUC pattern of a second type, a NUC indicator "3" indicates a 256QAM NUC pattern of a third type, a NUC indicator "4" indicates a 256QAM NUC pattern of a fourth type, and a NUC indicator "5" indicates a 256QAM NUC pattern of a fifth type.

It may be desirable to use uniform constellation patterns for low modulation orders since NUC patterns may be not effective at low modulation orders, whereas for higher modulation orders, NUC patterns may be more effective than uniform constellation patterns. For higher modulation orders, there are several types of NUC patterns because a NUC pattern may be optimized only for a specific Signal-to-Noise Ratio (SNR).

For example, a NUC pattern may depend on an expected operating point given the modulation order and a Transport Block Size (TBS) of an entry of an MCS table. The operating point may imply a Forward Error Correction (FEC) code rate and modulation order, which in turn may imply an expected operating SNR for a Block Error Ratio (BLER) of, for example, 10%. The expected operating SNR may be used to optimize a NUC pattern suited for a particular MCS index of an MCS table.

Therefore, in the MCS table of FIG. 3a, the NUC index is chosen so that for higher modulation orders, such as 16QAM, 64QAM, or 256QAM, NUCs are used preferably, whereas for lower modulation orders, also uniform constellations are used.

However, the lookup tables of FIG. 3b are only an example, which may be defined in a mobile wireless standard. In other embodiments, there may be, for instance, one lookup table with the three fields: modulation order, NUC indicator, and NUC pattern.

Figure 4A:
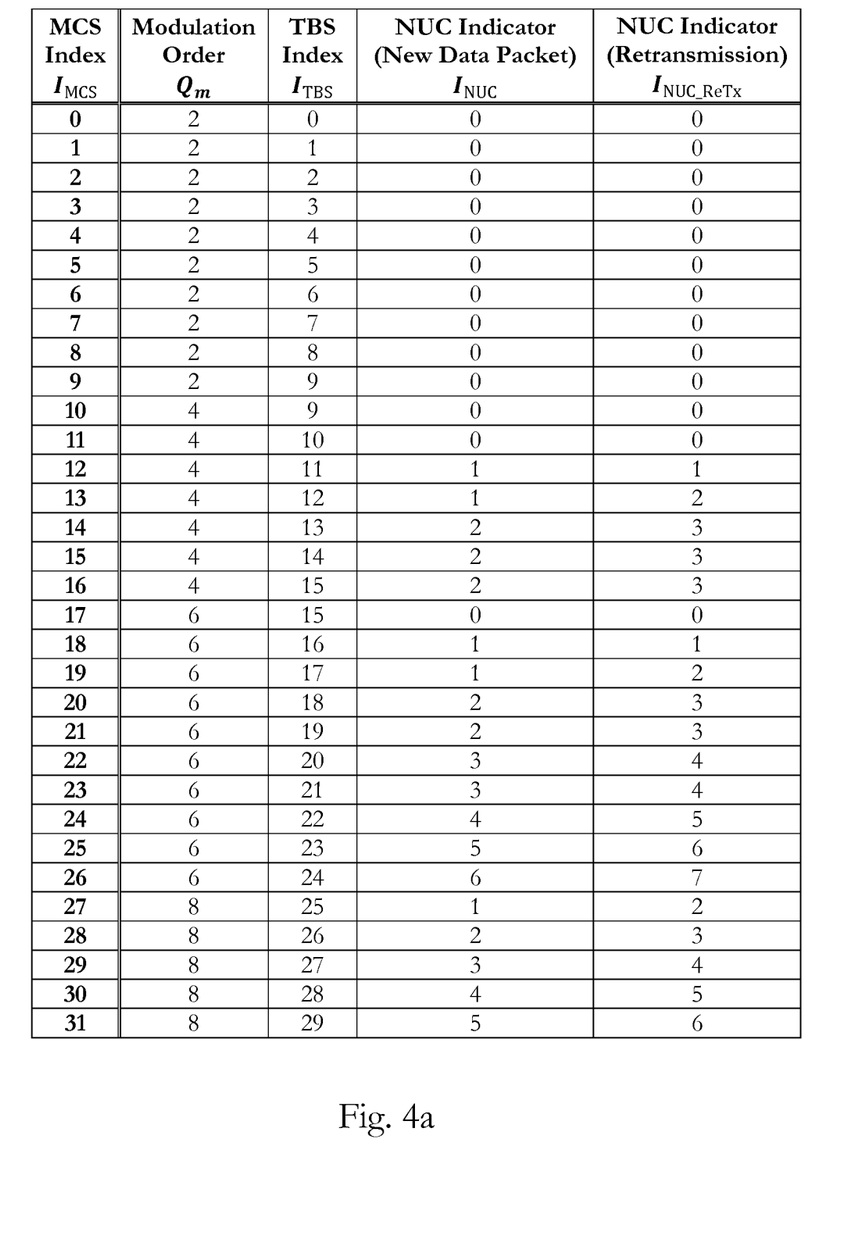
FIG. 4 shows an example MCS table providing a first NUC indicator for a new data packet and a second NUC indicator for a retransmission.

FIG. 4a shows an example reference lookup table that provides a first set of Non-Uniform Constellation (NUC) patterns for a new data packet (New Data Indicator set) and a second set of NUC patterns for a retransmission (New Data Indicator not set). The reference lookup table provides for an MCS index $I_{MCS}$, in addition to a modulation order $Q_m$ and a TBS index $I_{TBS}$, a first NUC indicator $I_{NUC}$ for a new data packet and a second NUC indicator $I_{NUC\_ReTx}$ for a retransmission. The first NUC indicator $I_{NUC}$ is used for new data packets, when a New Data Indicator (NDI) bit is set, and the second NUC indicator $I_{NUC\_ReTx}$ is used for retransmissions, when the NDI bit is not set. The NDI may be signaled in a respective field 15 of a DCI 10, as shown in FIG. 2a. A UE may use the first or the second NUC indicator, depending on whether the NDI bit is set or not, respectively. Since a NUC pattern may be targeted at a specific SNR radio condition, a transmission failure of a data packet may be due to an SNR radio condition at which the NUC pattern is not targeted, and another NUC pattern may be used for retransmission of the data packet, for example a NUC pattern that targets a lower SNR or a higher SNR.

Figure 4B:
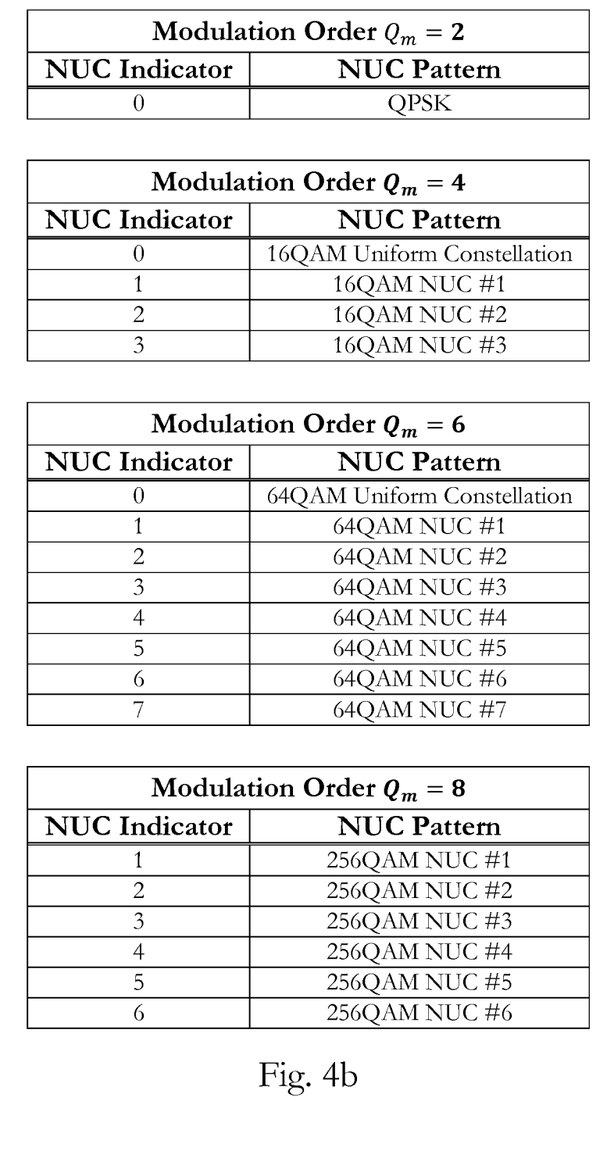

FIG. 4b shows lookup tables for a NUC indicator provided by an MCS table, such as the first NUC indicator and the second NUC indicator provided by the MCS table of FIG. 4a. For every modulation order in the MCS table, there is an own separate lookup table for the NUC indicator. The lookup tables of FIG. 4b are similar to the lookup tables of FIG. 3b, but provide NUC patterns for more NUC indicators in order to satisfy the requirements of the second NUC indicator of FIG. 4a.

According to the embodiment of FIG. 4b, in the NUC indicator lookup table for a modulation order of two, a NUC indicator "0" indicates Quadrature Phase-Shift Keying (QPSK), which is a 4QAM uniform constellation pattern.

In the NUC indicator lookup table for a modulation order of four, a NUC indicator "0" indicates a 16QAM uniform constellation pattern, a NUC indicator "1" indicates a 16QAM NUC pattern of a first type, a NUC indicator "2" indicates a 16QAM NUC pattern of a second type, and a NUC indicator "3" indicates a 16QAM NUC pattern of a third type.

In the NUC indicator lookup table for a modulation order of six, a NUC indicator "0" indicates a 64QAM uniform constellation pattern, a NUC indicator "1" indicates a 64QAM NUC pattern of a first type, a NUC indicator "2" indicates a 64QAM NUC pattern of a second type, a NUC indicator "3" indicates a 64QAM NUC pattern of a third type, a NUC indicator "4" indicates a 64QAM NUC pattern of a fourth type, a NUC indicator "5" indicates a 64QAM NUC pattern of a fifth type, a NUC indicator "6" indicates a 64QAM NUC pattern of a sixth type, and a NUC indicator "7" indicates a 64QAM NUC pattern of a seventh type.

In the NUC indicator lookup table for a modulation order of eight, a NUC indicator "1" indicates a 256QAM NUC pattern of a first type, a NUC indicator "2" indicates a 256QAM NUC pattern of a second type, a NUC indicator "3" indicates a 256QAM NUC pattern of a third type, a NUC indicator "4" indicates a 256QAM NUC pattern of a fourth type, a NUC indicator "5" indicates a 256QAM NUC pattern of a fifth type, and a NUC indicator "6" indicates a 256QAM NUC pattern of a sixth type.

The number of bits required to indicate a NUC, via an explicit or implicit NUC indicator, may become large when there are many potential NUC patterns per modulation order. Hence in an embodiment, a DCI signaling indicates a restricted subset out of a plurality of NUCs that information data is encoded with and a UE then blind decodes within the restricted subset to determine a NUC actually used.

For example, with reference to the 64QAM modulations of FIG. 3b, instead of an eNodeB explicitly signaling one of 7 NUCs (requiring 4 bits of signaling in the DCI), the eNodeB may signal with a single bit of DCI signaling that the NUC used is either from the set of {uniform, NUC #1, NUC #2, or NUC #3} or from the set of {NUC #4, NUC #5, or NUC #6}. If the single bit indicates a NUC from the set of {NUC #4, NUC #5, or NUC #6}, the UE may try to decode the data packet (e.g. PDSCH) with firstly NUC #4, then with NUC #5 and then with NUC #6. Any of these blind decodes that passes a Cyclic Redundancy Check (CRC) may then be considered by the UE to have used one of the particular NUCs.

Figure 5:
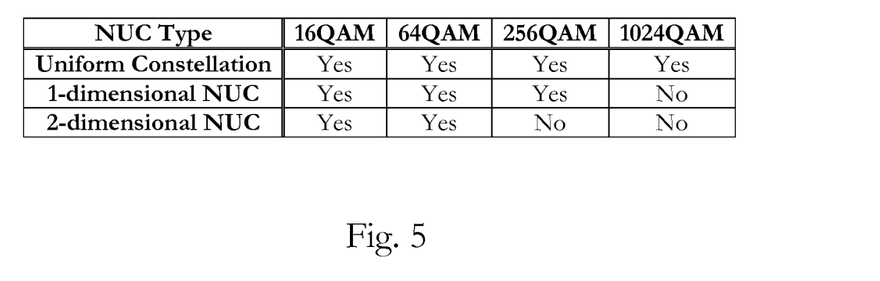
FIG. 5 illustrates a possible capability of decoding or encoding NUC types.

FIG. 5 illustrates an embodiment of information indicating a transceiver's capability of encoding and decoding Non-Uniform Constellation (NUC) patterns. A wireless communication transceiver, for example a UE or a base station, may only be capable of encoding or decoding certain types of NUC patterns. For example, a 1-dimensional NUC may be less complex to decode than a 2-dimensional NUC, but still provide gain over a uniform constellation, although the gain may be not as great as for a 2-dimensional NUC. Additionally, a complexity of decoding a NUC increases as a modulation order increases. For example, a 256QAM NUC may be more complex to decode than a 64QAM NUC. Therefore, a UE may have sufficient computational resources to decode a 2-dimensional 64QAM NUC, but may only have sufficient computational resources to decode a 256QAM NUC that is 1-dimensional. Accordingly, a UE may signal its capability to decode different modulation patterns (the NUC constellation) and orders (16QAM, 64QAM, 256QAM, etc.) within higher layer messages such as RRC Connection Setup Complete or uplink feedback signaling, such as channel state information (CSI).

The signaling information in FIG. 5 indicates that the wireless communication transceiver, here a UE, that transmits this information, is capable of decoding any type of uniform constellation, including 16QAM, 64QAM, 256QAM, and 1024QAM, but is only capable of decoding 1-dimensional 16QAM, 64QAM, and 256QAM NUCs, and is even only capable of decoding 2-dimensional 16QAM and 64QAM NUCs. A base station that receives this information from the UE may adapt its modulation scheme in accordance with this information. The information indicating a transceiver's capability of encoding and decoding NUC patterns may, for example, be signaled using RRC messages.

Figure 6:
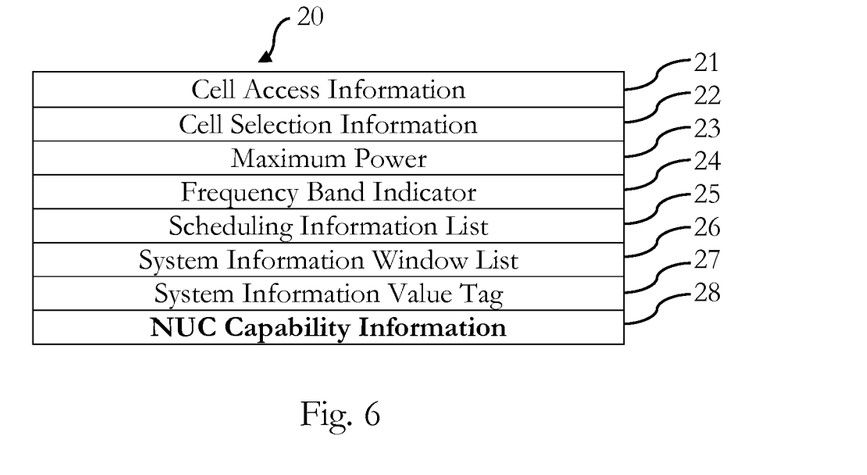
FIG. 6 shows an example System Information Block (SIB) providing a NUC capability information.

FIG. 6 shows an example System Information Block (SIB) 20 providing a NUC capability information. SIB 20 comprises various fields, the fields containing a cell access information 21, a cell selection information 22, an information about a maximum power 23, a frequency band indicator 24, a scheduling information list 25, a system information window list 26, a system information value tag 27, and a NUC capability information 28. The fields comprised by the SIB 20 may for example be defined in a specification of a mobile wireless communication standard. A base station may use the field containing the NUC capability information 28 to indicate to a UE which NUCs it can use in a transmission. The capability information 28 may for example have a form identical or similar to that displayed in the embodiment of FIG. 5.

Figure 7:
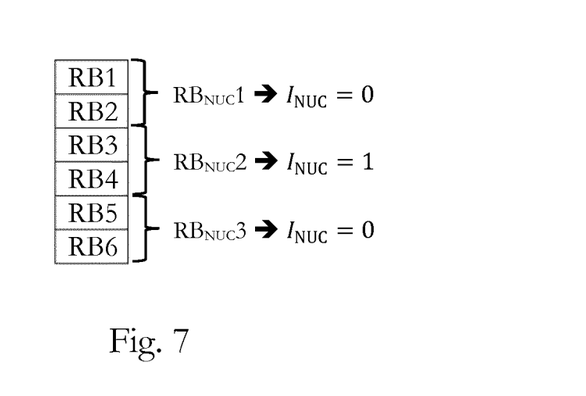
FIG. 7 shows Resource Blocks (RBs) grouped to NUC RBs.

FIG. 7 shows an embodiment in which a Non-Uniform Constellation (NUC) pattern is assigned to a respective group of Resource Blocks (RBs). According to this embodiment, an indicator indicating a group of RBs used for exchanging the information is used to also indicate a NUC pattern. FIG. 7 shows a case where a UE is scheduled with 6 (frequency) RBs RB1 to RB6, and where a NUC RB comprises two RBs, thereby giving three NUC RBs $RB_{NUC}$ 1 to $RB_{NUC}$ 3. For each of the NUC RBs $RB_{NUC}$ 1 to $RB_{NUC}$ 3, a NUC indicator $I_{NUC}$ is determined, the NUC indicator indicating a NUC for the respective NUC RB. A size of a NUC RB may be predefined in a specification of a mobile wireless standard or configured by a network. A DCI or UCI may indicate a NUC pattern used for a NUC RB. For example, there may be two possible NUC patterns for a given modulation order, where the modulation order is indicated in an MCS table. Then, the NUC indicator may be one bit to indicate the one of two NUCs to be used. In the example of FIG. 7, the NUC RBs $RB_{NUC}$ 1, $RB_{NUC}$ 2, and $RB_{NUC}$ 3 use the NUC pattern 0, 1, and 0, respectively. In another embodiment, however, there may be more than two different NUCs defined for a NUC RB. Different RBs in a selective channel may experience different Signal-to-Noise Ratios (SNRs) and hence may benefit from a different NUC pattern.

Figure 8:
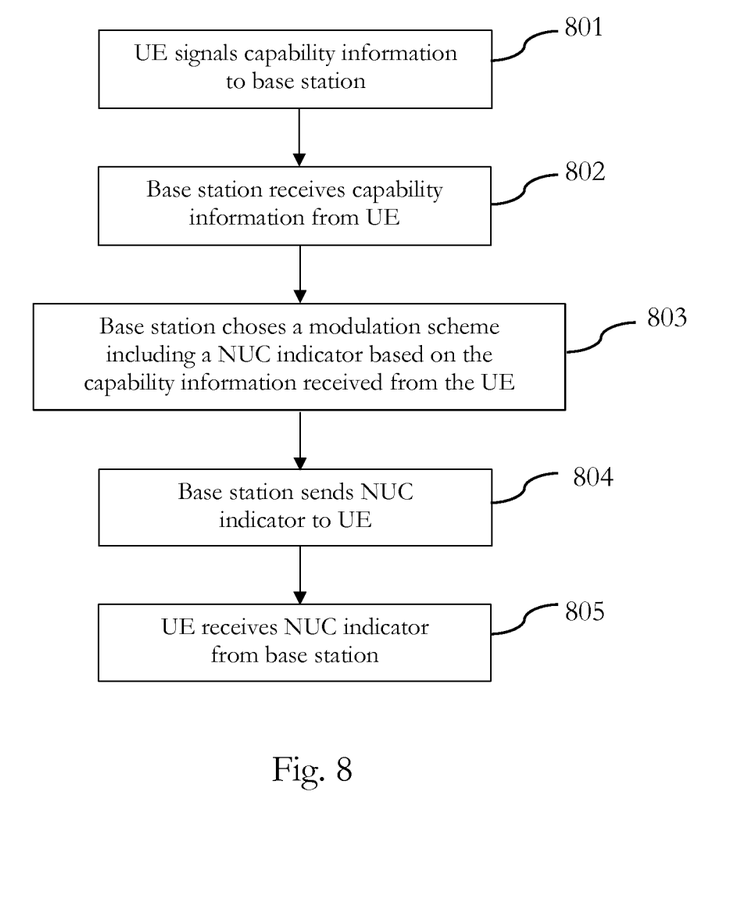
FIG. 8 illustrates a method comprising sending an indicator indicating a NUC pattern from a transceiver to another transceiver.

FIG. 8 illustrates a wireless communication method. At 801, a UE signals capability information to base station. At 802, the base station receives the capability information from the UE. At 803, the base station choses a modulation scheme including a NUC indicator based on the capability information received from the UE. At 804, the base station sends the NUC indicator to the UE. At 805, the UE receives the NUC indicator from the base station. The signaling of FIG. 8 may, for example, be performed by Radio Resource Control (RRC) signaling.

Figure 9:
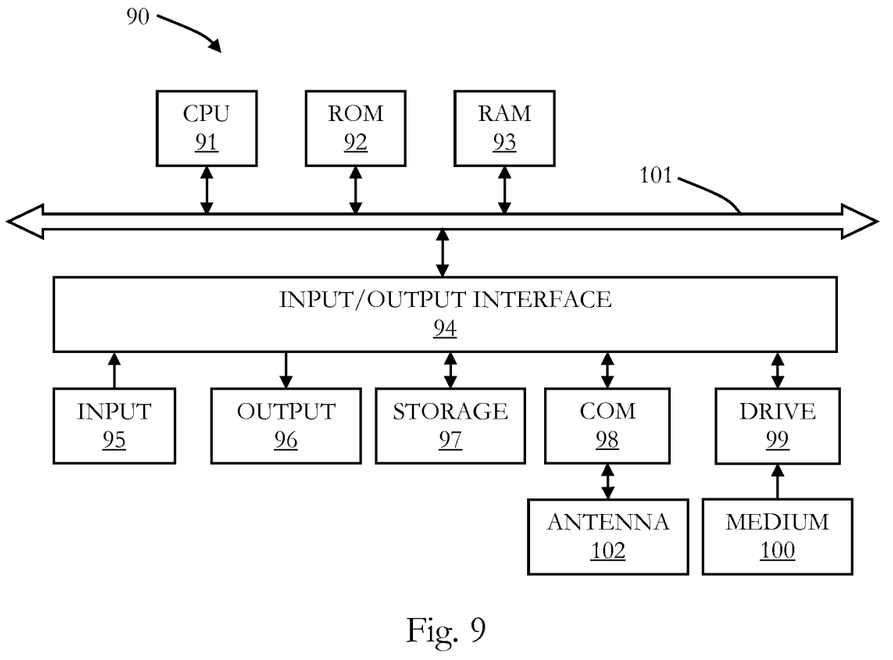
FIG. 9 illustrates a transceiver.

FIG. 9 shows an embodiment of a transceiver 90. The transceiver 90 can be implemented such that it can basically function as any type (anchor, slave, control plane, user plane, etc.) of base station, virtual/slave cell or user equipment as described herein. The transceiver has components 91 to 102, which can form a circuitry, such as anyone of the circuitries of the base station, virtual cell, slave cell, and user equipment, as described herein. The transceiver 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which in turn is connected to an input/output interface 94. The number of CPUs, memories and storages is only exemplary, and the skilled person will appreciate that the transceiver 90 can be adapted and configured accordingly for meeting specific requirements which arise, when it functions as a base station, virtual cell and user equipment.

At the input/output interface 94, several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc. The communication interface 98 uses an antenna 102 for communicating via radio networks such as WLAN, a mobile telecommunications system, Bluetooth, etc.

It should be noted that the description above only pertains to an example configuration of transceiver 90. Alternative configurations may be implemented with additional or other sensors, storage devices, interfaces or the like. For example, the communication interface 98 may support other radio access technologies than the mentioned UMTS and LTE.

When the transceiver 90 functions as a base station, the communication interface 98 can further have a corresponding air interface (providing e.g. E-UTRA protocols OFDMA (downlink) and SC-FDMA (uplink)) and network interfaces (implementing for example protocols such as S1-AP, GTP-U, S1-MME, X2-AP, or the like). The present disclosure is not limited to any particularities of such protocols.

Embodiments which use software, firmware, programs or the like for performing the methods as described herein can be installed on transceiver 90, which is then configured to be suitable for the concrete embodiment.

The methods as described herein are also implemented in some embodiments as a computer program causing a computer and/or a processor to perform the method when being carried out on the computer and/or processor. In some embodiments, also a non-transitory computer-readable recording medium is provided that stores therein a computer program product which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A wireless communication transceiver comprising circuitry configured to send or receive, via a wireless link, an indicator indicating a Non-Uniform Constellation pattern out of a plurality of Non-Uniform Constellation patterns.

(2) The wireless communication transceiver of (1), wherein the circuitry is further configured to exchange, via the wireless link, information being modulated using the Non-Uniform Constellation pattern indicated by the indicator.

(3) The wireless communication transceiver of (1) or (2), wherein the indicator is contained in a Downlink Control Information.

(4) The wireless communication transceiver of (3), wherein the indicator is an index to an entry of a reference lookup table, the reference lookup table providing Non-Uniform Constellation patterns for respective indices.

(5) The wireless communication transceiver of (4), wherein the index is a Modulation and Coding Scheme index.

(6) The wireless communication transceiver of (4) or (5), wherein the reference lookup table provides a first set of Non-Uniform Constellation patterns for a New Data Indicator being set and a second set of Non-Uniform Constellation patterns for the New Data Indicator being not set.

(7) The wireless communication transceiver of (3), wherein the indicator is an indicator indicating a redundancy version for a Hybrid Automatic Repeat Request retransmission.

(8) The wireless communication transceiver of anyone of (1) to (7), wherein the circuitry is further configured to send or receive, via the wireless link, information indicating a capability of encoding and decoding Non-Uniform Constellation patterns.

(9) The wireless communication transceiver of (8), wherein the circuitry is further configured to send or receive the information indicating a capability of encoding and decoding Non-Uniform Constellation patterns using Radio Resource Control signaling.

(10) The wireless communication transceiver of (8) or (9), wherein the information indicating a capability of encod- (11) The wireless communication transceiver of (1) or (2), wherein the indicator is contained in an Uplink Control Information.
(12) The wireless communication transceiver of (1) or (2), wherein the indicator is an indicator indicating a group of Resource Blocks used for exchanging the information, and wherein a Non-Uniform Constellation pattern is assigned to a respective group of Resource Blocks.
(13) The wireless communication transceiver of (1) or (2), wherein the indicator is included in a Channel State Information.
(14) The wireless communication transceiver of (1) or (2), wherein the wireless communication transceiver is a base station or a user equipment.
(15) A wireless communication method comprising signaling, via a wireless link, from a first transceiver of the wireless link to a second transceiver of the wireless link, an indicator indicating a Non-Uniform Constellation pattern out of a plurality of Non-Uniform Constellation patterns.
(16) The wireless communication method of (15), further comprising exchanging, via the wireless link, information being modulated using the Non-Uniform Constellation pattern indicated by the indicator.
(17) The wireless communication method of (15) or (16), wherein the indicator is contained in a Downlink Control Information.
(18) The wireless communication method of (17), wherein the indicator is an index to an entry of a reference lookup table, the reference lookup table providing Non-Uniform Constellation patterns for respective indices.
(19) The wireless communication method of (18), wherein the index is a Modulation and Coding Scheme index.
(20) The wireless communication method of (18) or (19), wherein the reference lookup table provides a first set of Non-Uniform Constellation patterns for a New Data Indicator being set and a second set of Non-Uniform Constellation patterns for the New Data Indicator being not set.
(21) The wireless communication method of (17), wherein the indicator is an indicator indicating a redundancy version for a Hybrid Automatic Repeat Request retransmission.
(22) The wireless communication method of anyone of (15) to (21), further comprising sending or receiving, via the wireless link, information indicating a capability of encoding and decoding Non-Uniform Constellation patterns.
(23) The wireless communication method of (22), further comprising sending or receiving the information indicating a capability of encoding and decoding Non-Uniform Constellation patterns using Radio Resource Control signaling.
(24) The wireless communication method of (22) or (23), wherein the information indicating a capability of encoding and decoding Non-Uniform Constellation patterns is contained in a System Information Block.
(25) The wireless communication method of (15) or (16), wherein the indicator is contained in an Uplink Control Information.
(26) The wireless communication method of (15) or (16), wherein the indicator is an indicator indicating a group of Resource Blocks used for exchanging the information, and wherein a Non-Uniform Constellation pattern is assigned to a respective group of Resource Blocks.
(27) The wireless communication method of (15) or (16), wherein the indicator is included in a Channel State Information.
(28) The wireless communication method of (15) or (16), wherein the first transceiver and/or the second transceiver is a base station or a user equipment.

The invention claimed is:

1. A wireless communication transceiver, comprising:
circuitry configured to
send or receive, via a wireless link, an indicator indicating a Non-Uniform Constellation pattern out of a plurality of Non-Uniform Constellation patterns,
wherein a first set of Non-Uniform Constellation patterns correspond to a New Data Indicator and a second set of Non-Uniform Constellation patterns correspond to a retransmission.

2. The wireless communication transceiver of claim 1, wherein the circuitry is further configured to exchange, via the wireless link, information being modulated using the Non-Uniform Constellation pattern indicated by the indicator.

3. The wireless communication transceiver of claim 1, wherein the indicator is contained in a Downlink Control Information.

4. The wireless communication transceiver of claim 3, wherein the indicator is an index to an entry of a reference lookup table, the reference lookup table providing Non-Uniform Constellation patterns for respective indices.

5. The wireless communication transceiver of claim 4, wherein the index is a Modulation and Coding Scheme index.

6. The wireless communication transceiver of claim 4, wherein the reference lookup table provides the first set of Non-Uniform Constellation patterns and the second set of Non-Uniform Constellation patterns.

7. The wireless communication transceiver of claim 3, wherein the indicator is an indicator indicating a redundancy version for a Hybrid Automatic Repeat Request retransmission.

8. The wireless communication transceiver of claim 1, wherein the circuitry is further configured to send or receive, via the wireless link, information indicating a capability of encoding and decoding Non-Uniform Constellation patterns.

9. The wireless communication transceiver of claim 8, wherein the circuitry is further configured to send or receive the information indicating a capability of encoding and decoding Non-Uniform Constellation patterns using Radio Resource Control signaling.

10. The wireless communication transceiver of claim 8, wherein the information indicating a capability of encoding and decoding Non-Uniform Constellation patterns is contained in a System Information Block.

11. The wireless communication transceiver of claim 1, wherein the indicator is contained in an Uplink Control Information.

12. The wireless communication transceiver of claim 1, wherein the indicator is an indicator indicating a group of Resource Blocks used for exchanging the information, and wherein a Non-Uniform Constellation pattern is assigned to a respective group of Resource Blocks.

13. The wireless communication transceiver of claim 1, wherein the indicator is included in a Channel State Information.

14. The wireless communication transceiver of claim 1, wherein the wireless communication transceiver is a base station or a user equipment.

15. The wireless communication transceiver of claim 1, wherein the circuitry is further configured to
in response to a transmission failure of a data packet due to a signal-to-noise ratio (SNR) radio condition at which the Non-Uniform Constellation patter is not targeted, use a Non-Uniform Constellation pattern that targets a lower SNR or a higher SNR.

16. A wireless communication method, comprising:
signaling, via a wireless link, from a first transceiver of the wireless link to a second transceiver of the wireless link, an indicator indicating a Non-Uniform Constellation pattern out of a plurality of Non-Uniform Constellation patterns,
wherein a first set of Non-Uniform Constellation patterns correspond to a New Data Indicator and a second set of Non-Uniform Constellation patterns correspond to a retransmission.

\* \* \* \* \*